(No Model.)

N. SHAW.
FRICTION CLUTCH.

No. 465,786. Patented Dec. 22, 1891.

Witnesses: J. P. Theodang, E. T. Fenwick

Inventor: Noah Shaw by his Attorneys Mason, Fenwick & Lawrence

UNITED STATES PATENT OFFICE.

NOAH SHAW, OF EAU CLAIRE, WISCONSIN.

FRICTION-CLUTCH.

SPECIFICATION forming part of Letters Patent No. 465,786, dated December 22, 1891.

Application filed June 4, 1888. Serial No. 275,996. (No model.)

*To all whom it may concern:*

Be it known that I, NOAH SHAW, a citizen of the United States, residing at Eau Claire, in the county of Eau Claire and State of Wisconsin, have invented certain new and useful Improvements in Friction-Clutches for Pulleys; and I do hereby declare the following to be a full, clear, and exact description of the invention, such as will enable others skilled in the art to which it appertains to make and use the same.

My invention relates to friction-clutches for pulleys, wheels, and shaftings, also to their pulleys; and it consists in certain novel constructions, combinations, and arrangements of parts, as will be hereinafter described and specifically claimed, whereby a friction-clutch of great power, easy operation, and comparatively small cost is produced, and waste of lubricating material prevented.

Figure 1:
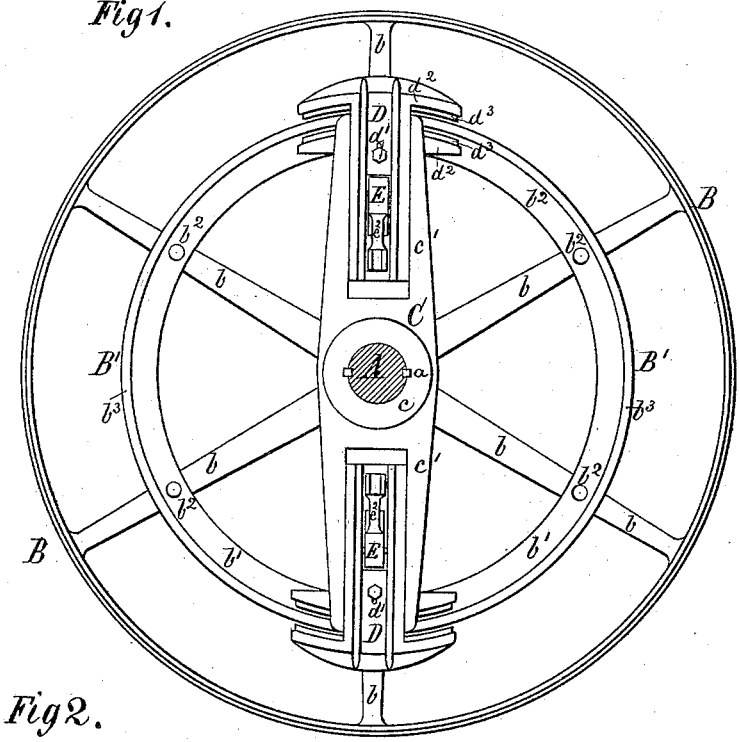
Figure 2:
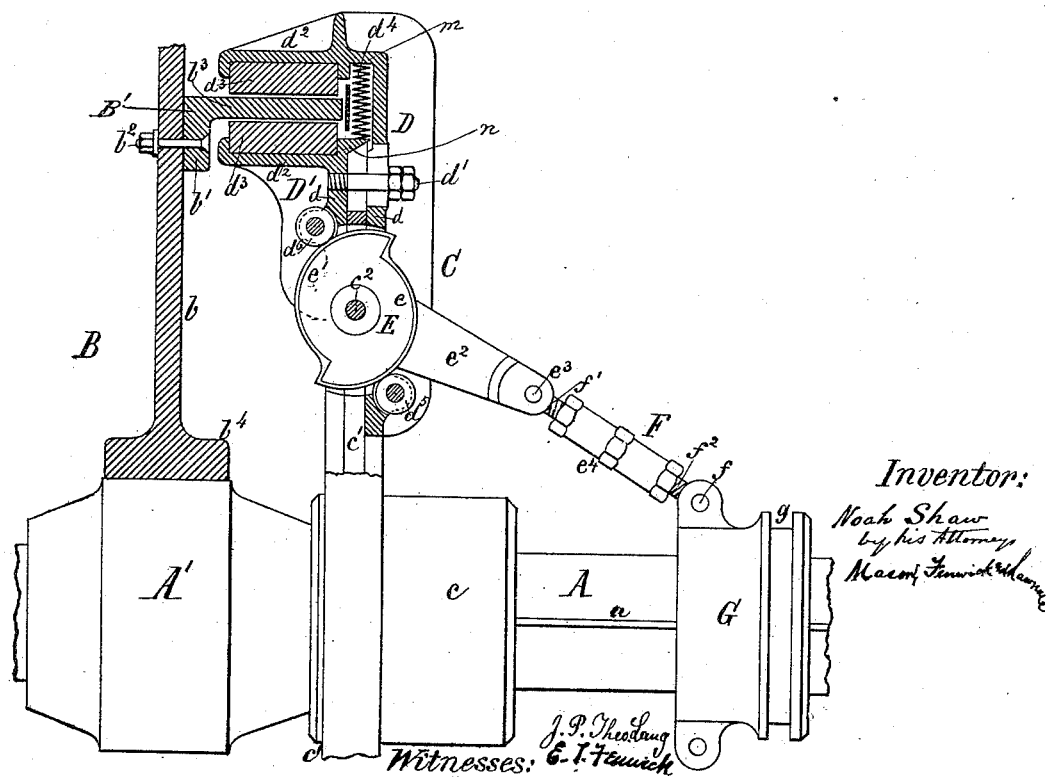

In the accompanying drawings, Figure 1 is a cross-section of the pulley-shaft and an end view of my invention, certain parts being omitted in order to plainly exhibit others which would be hidden. Fig. 2 is a longitudinal section through a portion of the clutch-pulley and the upper half of the clutching mechanism.

The letter A in the drawings represents the shaft which supports the friction-clutch pulley; A′, the hub; B, the pulley; B′, a friction-rim; C, a clutch-frame; D D′, clutching-clamps; $d^5$, contact-rollers or equivalent projections; E, clutch-operating cam; F, toggle-lever, and G toggle-slide.

Upon the hub A′ the enlarged portion $b^4$ of the pulley B is secured, and by this construction the said portion with the pulley can be removed from the hub when necessary for any desired purpose. The invention hereinafter claimed is not dependent upon this construction specially, and any other suitable way of having the hub and pulley united may be adopted.

To the arms $b$ of the pulley B the friction-rim B′ is fastened by means of an angular flange $b′$ and bolts or rivets $b^2$. The cylindrical portion $b^3$ of the friction-rim B′ stands in range of the clutch mechanism, above mentioned, and which I will now describe more specifically. Next to the hub A′ a hub $c$ of the clutch-frame C is securely fastened to the shaft A. Radial arms $c′$, provided on the hub $c$, serve as supports and guides for the clutching-clamps D D′, the shanks $d$ of which are held together by a bolt $d′$, so as to allow vertical motion. The shanks $d$ are provided with recessed heads $d^2$, into which bearing-blocks $d^3$ are inserted, and by means of which the cylindrical portion $b^3$ of the rim B′ is "gripped" when the clutching-clamps are drawn upon it. In their normal position the clutching clamps, members, or jaws D D′ are held away from the rim B′ by the tension of a spring $d^4$, inserted between the bearings $m$ $n$ of the heads $d^2$, whereby also two anti-friction rollers or projections $d^5$ $d^6$ of the said clutching-clamps are held in contact with the cam E. This cam E has two symmetrical cam-surfaces $e$ $e′$, of which the surface $e$ bears against the projection or roller $d^5$ of clutching clamp, member, or jaw D, and the surface $e′$ against the roller or projection $d^6$ of clamp $d′$. The cam E is pivoted at $c^2$ to the arm $c′$, and is provided with an arm $e^2$, which arm forms one link of the toggle-lever F, and is, by means of a pin $e^3$, pivoted to an ordinary expansible device, which forms the other link $e^4$ of the toggle-lever, and is pivoted at $f$ to the slide G, which is loosely fitted to the shaft A, and kept from turning thereon by a spline or key $a$. By means of the right and left screw-thread $f′$ $f^2$ of the link $e^4$ the toggle-lever can be lengthened, and thus wear of the friction-clamps compensated for, as occasion requires. An annular groove $g$ in the slide G serves, in connection with an ordinary forked shipper, (not shown,) to move the slide to and from the clutch-frame C, and thus to clutch or release the rim B′. Each arm $c′$ of the clutch-frame is provided with a mechanism similar to that above described, and the mechanisms are connected by means such as described with the slide G, thus securing a radially uniform action and avoiding one-sided and unequal strain upon the parts.

I would state that while anti-friction or rolling contact-surfaces, as $d^5$ $d^6$, are far preferable to fixed or non-rolling cylindrical pins for forming contact-surfaces for the cams, I do not confine myself to having such contact-surfaces capable of rolling, as they might in some cases be fixed projections or pins, and yet serve a useful purpose.

I have represented one pair of radial arms $c'$ and cams E adapted for operating the clamps of said arms; but it is contemplated to employ a clutch-frame having any suitable number of radial arms $e'$ with clamps D D', as shown, and to provide a cam, as E, for operating each pair of clamps, accordingly as the size of the pulley may require.

What I claim is—

1. The combination, in a friction-clutch, of the pulley or wheel having a friction-rim B', the clutch-frame C, the clutching members D D', the contact projections for the cam, and the cam E, formed with a toggle-lever link-arm and having two symmetrical cam-surfaces $e\ e'$ set the reverse of each other, said cam being pivoted to the clutch-frame, all substantially as described.

2. The combination, in a friction-clutch, of the pivoted cam E, formed with two oppositely-set symmetrical cam-surfaces $e\ e'$ of gradually-decreasing eccentricity, a rigidly-connected toggle-lever link-arm $e^2$, the toggle-lever link $e^4$, and the slide G, substantially as described.

3. The combination, in a friction-clutch, of the pulley or wheel having a friction-rim, the clutch-frame C, cam E, the clutching members D D', formed, respectively, with contact projections for the same and with a bearing for a spring, and the spring $d^4$, applied between said bearings and acting to move the members away from the rim and keep both of their contact projections always against the cam, substantially as described.

4. The combination, in a friction-clutch, of the pivoted cam E, formed with two symmetrical cam-surfaces of gradually-decreasing eccentricity and with a rigidly-connected arm $e^2$, the link $e^4$ of the expansible toggle-lever F, the clutch-frame C, the clutching members D D', and pulley or wheel B, having a friction-rim B', substantially as described.

5. In a clutch, the combination, with a pulley or wheel having a friction-rim, of a pivoted operating-cam E, clutching members D D', and anti-friction-roller-surfaced projections $d^5\ d^6$, substantially as and for the purpose described.

6. In a friction-clutch, the combination of a pulley having a cylindrical flange, a clutch-arm, and two inversely and radially movable clutching members of the type specified with a movable cam adapted to engage with the shanks of said clutch members, substantially as described.

7. In a friction-clutch, the combination of a pulley having a cylindrical flange, a radial clutch-arm, and two inversely and radially movable clutching members of the type specified, with a movable cam adapted to engage with the shanks of said members, a shifting-sleeve, suitable connection between said sleeve and cam, and means for supporting and insuring the action of said cam, substantially as described.

8. In a friction-clutch, the combination of a pulley having a cylindrical flange, a radial clutch-arm, two inversely and radially movable clutching members of the type specified, a support and contact, projecting connections, a movable cam, a shifting-sleeve, and an adjustable connection between said cam and shifting-sleeve, substantially as described.

9. The combination of a pulley having a cylindrical flange and two inversely and radially movable clutching members of the type specified, with a radially-guiding clutch-arm, a cam interposed between the inner ends of said clutching members for the purpose of moving the same, and a spring placed between the shanks of said clutching members, said clutching members being provided with the shoulders, against which said spring thrusts, substantially as described.

10. The combination of a pulley having a cylindrical flange and two inversely and radially movable clutching members of the type specified, a movable cam interposed between said clutching members, a guiding clutch-arm, and means and mechanism for moving said cam, substantially as described.

11. In a friction-clutch, a frame for supporting the clutching members, having radial guiding-arms arranged on opposite sides of the shaft, and inversely and radially movable clutching members of the type specified, arranged in pairs on opposite sides of the shaft, means for connecting the members of each pair, and movable cams interposed, respectively, between the respective pairs of clutching members—i. e., one for each pair of clutching members—substantially as described.

12. The combination of a pulley having a cylindrical flange and two inversely and radially movable clutching members of the type specified, with a cam interposed between the inner ends of the shanks of the clutching members, contact projecting connections between the cam and the inner ends of the said clutching members, and mechanism for moving said cam, substantially as described.

13. The combination of a pulley having a cylindrical flange, two inversely and radially movable clutching members of the type specified, and a clutch-arm upon which the shanks of the members are mounted, and the outer one of said members provided with a shoulder and the inner one also provided with a shoulder in substantially the same plane with the other shoulder, but nearer to the shaft, and a spring arranged to thrust against said shoulders, substantially as described.

14. In combination with a pulley or wheel having a friction-rim, an operating-cam, and clutching members having means for effecting a bearing-contact upon said cam, substantially as described.

15. In a friction-clutch having inversely radially moving clutching members constructed and arranged to grip a flange concentric to the shaft and moving upon a clutch-arm, in combination, a bearing-contact projection on the respective shanks of said members, a cam interposed between the said bearing contact projections, the said parts being so arranged and constructed that the direction of force exerted by the cam upon the respective contact projections passes upon the opposite side of the center of motion of the cam to that on which the member is located and to which the contact projection belongs, and mechanism whereby the said cam may be operated, substantially as described.

16. In a clutch, in combination, a pulley having a friction-flange concentric to the shaft, inversely-moving clutching members constructed, arranged, and adapted to grasp the flange on the inside and outside, a clutch-arm upon which said members move, a contact projection from each of said members, said projections being on opposite sides of the radial line through the center of motion of the cam, a cam interposed between the said contact projections, a shifting-sleeve, and mechanism whereby motion may be communicated from the shifting-sleeve to the cam, substantially as described.

In testimony whereof I hereunto affix my signature in presence of two witnesses.

NOAH SHAW.

Witnesses:
D. M. DULVENY, Jr.,
C. A. CHAMBERLIN.